(12) United States Patent
Stahn et al.

(10) Patent No.: US 9,657,876 B2
(45) Date of Patent: May 23, 2017

(54) SCREW CONNECTION DEVICE FOR CONNECTING TWO PIPES

(71) Applicant: TI Automotive (Heidelberg) GmbH, Heidelberg (DE)

(72) Inventors: Andreas Stahn, Rauenberg (DE); Ünal Özbenlikan, Rauenberg (DE)

(73) Assignee: TI AUTOMOTIVE (HEIDELBERG) GMBH, Heidelberg (DE)

( * ) Notice: Subject to any disclaimer, the term of this patent is extended or adjusted under 35 U.S.C. 154(b) by 27 days.

(21) Appl. No.: 14/686,359

(22) Filed: Apr. 14, 2015

(65) Prior Publication Data
US 2015/0292658 A1 Oct. 15, 2015

(30) Foreign Application Priority Data
Apr. 14, 2014 (DE) .................... 20 2014 101 748 U

(51) Int. Cl.
*F16L 25/12* (2006.01)
*F16L 19/02* (2006.01)
*F16L 19/025* (2006.01)

(52) U.S. Cl.
CPC ............ *F16L 25/12* (2013.01); *F16L 19/025* (2013.01); *F16L 19/0218* (2013.01)

(58) Field of Classification Search
CPC ..... F16L 25/12; F16L 19/025; F16L 19/0218; F16L 13/142; F16L 13/143
USPC ....................................................... 285/379
See application file for complete search history.

(56) References Cited

U.S. PATENT DOCUMENTS

| 431,816 | A | | 7/1890 | Lomasney |
| 2,445,578 | A | | 7/1948 | Howe |
| 5,076,594 | A | * | 12/1991 | Baugh .................... F16J 15/002 277/615 |

(Continued)

FOREIGN PATENT DOCUMENTS

| CA | 2406563 A1 * | 4/2004 | ............ F16L 13/143 |
| DE | 36 02 499 A1 | 8/1986 | |

(Continued)

OTHER PUBLICATIONS

European Patent Office, International Search Report in European Patent Application No. 20 2014 101 748.8 (Feb. 12, 2015).

*Primary Examiner* — James M Hewitt
(74) *Attorney, Agent, or Firm* — Brinks Gilson & Lione

(57) ABSTRACT

A screw connection device for connecting two pipes, comprising two pipes with flanged pipe ends, a screw, a nut, and a spacer, wherein the nut includes a receiving space, wherein the spacer is securely received in the receiving space. The spacer retains the first pipe securely in the nut, wherein the second pipe is retained in the screw and can be fastened in the nut by means of the screw. An exterior surface of the spacer has at least one cylindrical section, wherein the spacer has a first end surface and a second end surface. A first projection is provided on the spacer, which engages with the nut in the region of the receiving space such that it is securely accommodated therein. The nut includes an exterior surface with flat sub-surfaces. At least one flat sub-surface includes an indentation to form a detent in the retaining space to secure the spacer in the nut. In one form the exterior of the nut has six flat sub-surfaces and every other flat sub-surface has a detent.

13 Claims, 4 Drawing Sheets

(56) References Cited

U.S. PATENT DOCUMENTS

| | | | | |
|---|---|---|---|---|
| 5,378,023 A | * | 1/1995 | Olbrich | ................ B21D 39/04 285/24 |
| 5,482,332 A | * | 1/1996 | Ohmi | ................ F16L 27/0824 285/328 |
| 2009/0102190 A1 | | 4/2009 | Koji et al. | |

FOREIGN PATENT DOCUMENTS

| | | |
|---|---|---|
| DE | 37 01 555 C1 | 7/1988 |
| DE | 603 05 641 T2 | 5/2007 |
| DE | 10 107 246 C5 | 6/2010 |
| EP | 1 528 309 A1 | 5/2005 |
| EP | 2 642 172 A1 | 9/2013 |
| JP | HO7 248 079 A | 9/1995 |

\* cited by examiner

SCREW CONNECTION DEVICE FOR CONNECTING TWO PIPES

CROSS-REFERENCE TO RELATED APPLICATION

This application claims priority pursuant to Title 35 USC §119(b) to German application 20 2014 101 748.8, filed Apr. 14, 2014, the entire content of the specification claims and drawings of which are incorporated by reference herein as if fully set forth herein.

BACKGROUND OF THE INVENTION

The invention relates to a screw connection device for connecting two pipes, comprising two pipes with flanged pipe ends, a bolt, a nut and a spacer.

Screw connection devices of the aforementioned type are fundamentally known from the existing literature. EP 2 642 172 A1 teaches of a screw connection device for connecting two flanged pipe ends of two pipes, in particular for brake lines. The device further comprises a nut and a bolt, wherein a spacer serves as a fluid-tight coupling for the two pipes inside a coupling piece designed as a nut. The second pipe is tightened down by means of the bolt, by means of which a seal is ensured. In a pre-assembly the first pipe as well as the spacer are inserted into the nut, and first connected to the second pipe during assembly, possibly at another location. In order to ensure that the spacer does not fall out of the nut during a possible transport between the pre-assembly and the assembly, according to the aforementioned document, it is retained in the receiving space by means of a thread profile of the inner thread of the nut, extending through the receiving space. The spacer can be screwed into the inner thread of the nut by means of the outer thread provided thereon, until it no longer engages with said inner thread, and instead is located in a section of the receiving space having no thread. It is held securely in place there by the inner thread of the nut, extending through the receiving space, thus significantly reducing the difficulties encountered during the assembly. It is, however, disadvantageous that, according to this solution, the spacer must be provided with an outer thread, which in turn increases the complexity. Moreover, the simple screwing of the spacer therein also results in a certain complexity.

DE 10 107 246 C5 makes known the production of a spacer without an outer thread, which is nevertheless retained securely in a receiving space. This is obtained by means of a ring, on the edge of the receiving space having no thread, extending into the receiving space, which is produced after insertion of the first pipe and the spacer by means of stamping in an axial direction. In the longitudinal section it is apparent that the stamping results in a ring, having a detent-like shaped cross-section, and on the whole is quite delicate. In order to produce such a ring, the stamping tool must be precisely oriented, thus increasing the complexity. Even a very slight carelessness in orienting the stamping tool leads to breaks, or gaps in the ring, resulting in an increased reject rate.

For this reason, the invention addresses the technical problem of providing a screw connection device of the type specified in the introduction, distinguished in that it can be reliably assembled, and which is furthermore easy to produce.

SUMMARY OF THE INVENTION

In order to solve the technical problem, the invention teaches of a screw connection device for connecting two pipes, comprising two pipes with flanged pipe ends, a bolt, a nut, and a spacer, wherein the nut comprises a receiving space, wherein the spacer is received securely in the receiving space, wherein the spacer securely retains the first pipe in the nut, wherein the second pipe can be fastened in the nut by means of the bolt, wherein an outer surface of the spacer has at least one cylindrical section, wherein the spacer has a first and second end surface, characterized in that a first projection is provided on the spacer, which engages with the nut in the region of the receiving space, for a secure accommodation thereof.

The expression "flanged" refers to such flanges as those corresponding to the typical standards in the field of motor vehicles. These include, in particular, F- and E-flanges.

The term "securely" means that in order to remove the pre-assembled spacer, forces must be exerted that exceed those forces that can be applied by a human hand.

The term "pre-assembled" means that the screw is not, or is only partially, screwed into the nut. In the pre-assembled state, it is preferred, in particular, that no compression force is exerted on the second flange by the bolt. In contrast, the term "assembled" means that the second flange is pressed against the spacer in a fluid-tight manner, and the spacer is pressed against the first flange in a fluid-tight manner, by means of the compression force. In the assembled state, a fluid can thus flow in a fluid-tight manner through the pipes. The fluid can be brake fluid or fuel.

It is within the scope of the invention that the receiving space has a circular cylindrical form. In corresponding to the receiving space, the spacer is also cylindrical in at least one section thereof. As a result, the spacer also has a cylindrical exterior surface, bordered by a first and second end surface. "Cylindrical" as set forth in the invention also comprises a hexagon and polygons of higher orders. The end surfaces of the spacer are formed such that they are complementary to the flanges on the pipe ends. It is recommended that at least one end surface is intended as a receiver for an F-flange. Preferably both end surfaces are intended for receiving F-flanges.

The expression "projection" means that a part of the spacer, having the shape described above, projects, thus deviating from the shape described above, in that this part protrudes outward. The spacer and the projection(s) may be designed as an integrated element. The element can, however, also be a two-part element, or be composed of numerous parts.

The term "engage" means that the first projection and the nut interact, such that the spacer is prevented from falling out of the nut. The reference value for this is the force exerted by the human hand. Further, the expression "engage" implies that the secure accommodation of the spacer is obtained by a form fitting. A force-locking is impractical due to the assembly still to be executed, as is also the case with a material bonding (e.g. with adhesive), which would result in greater complexity in the pre-assembly.

It is within the scope of the invention that the first projection on the spacer encompasses said spacer, at least in part. Preferably, the first projection encompasses the spacer along the circumference of the cylindrical exterior surface. When the first projection fully encompasses the spacer, it forms a ring. The projection can, however, encompass the spacer only in sections, and, by way of example, exhibit two semi-circular projections, having two indentations there between. The indentations can, however, comprise larger angles, such that individual detents, or even just one individual detent, lie within the scope of the invention as the smallest possible shape of the projection.

Preferably the first projection borders on the cylindrical exterior surface of the spacer. In this manner, the first projection can border on the cylindrical exterior surface of the spacer in both axial directions. It is also within the scope of the invention, however, when the first projection borders on the cylindrical exterior surface of the spacer in only one axial direction.

In a recommended design, the first projection borders on the first end surface. According to a particularly preferred design, the first projection borders on the first end surface and on the cylindrical exterior surface of the spacer. In this manner, the first projection separates the cylindrical exterior surface from the first end surface. According to another preferred embodiment, a first flank of the first projection is flush with the first end surface of the spacer. The first flank can be designed—in the longitudinal section of the screw connection device—such that it is perpendicular to the axis of the screw connection device. It is furthermore within the scope of the invention when the flank is not oriented perpendicular to the axis, but rather, in the case of F-flanges, by way of example, forms an extension of the cone angle of the spacer.

Preferably the first projection projects radially outward. The term "radial" is in reference to the axis of the screw connection device, which, in particular, refers to the axes of the two pipes as well. Thus, a radial projection corresponds to a projection extending from the spacer toward the nut. In doing so, the walls of the projection can also exhibit an axial component, in addition to the radial component. Furthermore, the expression "projection" is not to be defined such that the walls of the projection, with respect to the cylindrical exterior surface, must form an angle. Instead, the transition from the walls of the projection to the cylindrical exterior surface can be rounded.

It is within the scope of the invention that the first projection has a height corresponding to 1% to 20%, preferably 3% to 15%, and particularly preferably 6% to 10% of the radius of the spacer in the region of the first projection. The height is related thereby to the difference between the radius of the cylindrical exterior surface, on one hand, and the radius in the region of the first projection. The radius in the region of the first projection is that radius that is the greatest radius in this region. Further embodiments provide for a height of the first projection that corresponds to 5% to 12%, or 7% to 9%, respectively, of the radius of the spacer in the region of the first projection. The tolerance for the height of the first projection lies between ±0.01 mm and 0.2 mm, and preferably between ±0.02 mm and 0.1 mm.

It is within the scope of the invention that the first projection exhibits a width corresponding to 5% to 50%, preferably 10% to 40%, and particularly preferably 15% to 30%, and very particularly preferably 17% to 25% of the overall width of the spacer. The tolerance for the width of the first projection lies between ±0.02 mm and 0.4 mm, and preferably between 0.05 mm and 0.2 mm.

According to another embodiment, the spacer has a second projection, which, together with the first projection, forms a groove, at least in sections. It is recommended that the second projection corresponds to the first projection, according to at least one preferred feature. Preferably both projections encompass the spacer along the circumference of the cylindrical exterior surface. It is preferred that both projections run parallel to one another. Furthermore, it is within the scope of the invention when the second projection only encompasses the spacer in part. The second projection can, in the most extreme case, only comprise a detent formed at a point. It is within the scope of the invention that the second projection borders on the cylindrical exterior surface of the spacer. Preferably, the second projection borders on the second end surface thereof. According to another preferred design, a second flank of the second projection is flush with the second end surface of the spacer.

According to a preferred embodiment, the nut exhibits at least one detent extending inward in the region of the receiving space, and preferably, exhibits three detents extending inward. Thus, the detent(s) extend toward the spacer, into the receiving space. It is within the scope of the invention that the nut comprises 2, 4, 5 or 6 detents. According to another embodiment, the nut exhibits numerous detents, which transition into one another due to the multitude thereof, and thus form a ring.

Preferably, the detent, or the three detents, respectively, are each allocated to an indentation on the exterior of the nut. This can be obtained by means of stamping.

According to a preferred embodiment, the nut has, at least in sections in the receiving space, an exterior surface having at least four sides, defined by four flat sub-surfaces. Preferably the exterior surface of the nut is hexagonal, and has six flat sub-surfaces. Furthermore, eight- or ten-sided exterior surfaces, by way of example, also lie within the scope of the invention. This applies to a nut having an arbitrarily large number of flat sub-surfaces as well, which then corresponds to a cylindrical exterior surface.

Preferably the at least one, and preferably three, indentations are allocated to one, or three, respectively, of the flat sub-surfaces. Preferably each sub-surface has an indentation. It is particularly preferred that every second of the six sub-surfaces, in an alternating manner, includes an indentation. According to another embodiment, the three detents are disposed along the circumference of the nut at an angle of 90° to 150°, preferably at an angle of 100° to 140°, particularly preferably at an angle of 110° to 130°, and very particularly preferably at an angle of 115° to 125°.

In order to solve the technical problem, the invention teaches of a method with an inventive screw connection device for connecting two pipes, wherein the screw connection device comprises two pipes with flanged pipe ends, a bolt, a nut, and a spacer, wherein the nut has a receiving space, wherein an exterior surface of the spacer has at least one cylindrical section, wherein the spacer has a first and a second end surface, wherein a first projection is disposed on the spacer, wherein a first pipe is inserted into the nut with the flanged end thereof, wherein the spacer is subsequently inserted into the nut, wherein, subsequently, the nut is caulked in the region of the receiving space, with a force acting radially inward, such that the spacer is brought into a secure engagement with the nut, such that it cannot come loose, due to the first projection in the region of the receiving space, wherein the second pipe is fastened in the nut by means of the bolt, such that a fluid-tight bond is obtained between the two pipes.

The invention is based on the fact that a screw connection device according to the invention is distinguished in that it can be assembled easily, and at the same time, can be produced in a simple manner. According to the invention, it is ensured that the spacer is reliably retained in the receiving space in the pre-assembled state as well. It is impossible to lose the spacer, e.g., during transport, thus reducing the complexity of the assembly. As a result of the stamping of the sub-surfaces of the nut, it is possible to ensure that the spacer cannot be lost in a quick and simple manner. This reduces the unit costs, both directly as well as indirectly, via the tendency to err, by means of which losses due to rejects are reduced.

DESCRIPTION OF THE DRAWINGS

The invention shall be explained in detail below, based on illustrations of two embodiment examples, shown in the drawings, in which.

DETAILED DESCRIPTION

Figure 1:
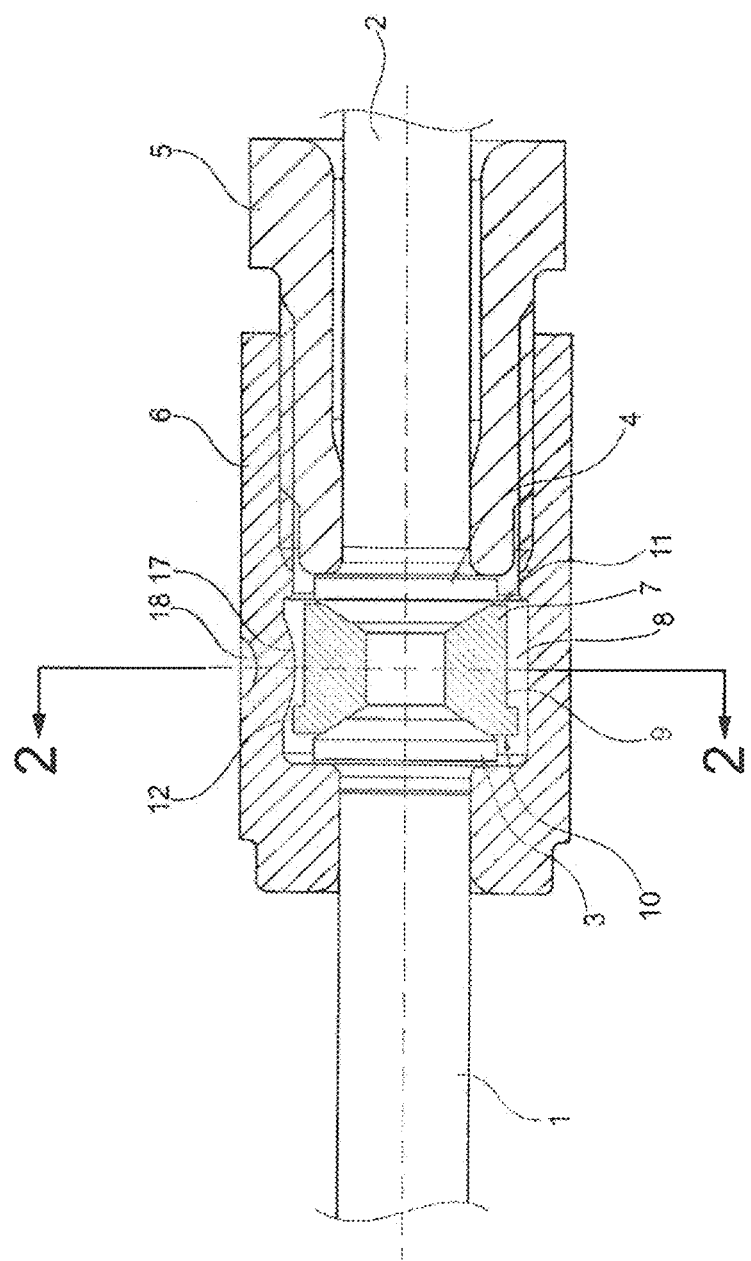
FIG. 1 is a sectional plan view of the screw connection device of the present invention.

A screw connection device is illustrated in FIG. 1, comprising two pipes 1, 2 with flanged pipe ends 3, 4, a screw 5, a nut 6, and a spacer 7. The flanged pipe ends 3, 4 are designed as F-flanges. The spacer 7 has an internal conical sealing surface on each of its end surfaces 10, 11, which are compressed against the conical surfaces of the F-flanges. This compression is obtained by means of the screw 5, which engages with the internal thread of the nut 6, and thus presses the pipe 2 against the spacer 7. A fluid-tight connection is obtained by means of the pressure.

In the pre-assembled state, not shown here, only the pipe 1 and the spacer 7 are located inside the receiving space 8 of the nut 6. A projection 12 on the spacer 7, as well as three detents 17 (see FIG. 2) of the nut 6 are engaged with one another and thus prevent the spacer 7 from falling out, and as a result, also prevent the pipe 1 from falling out of the receiving space.

Figure 2:
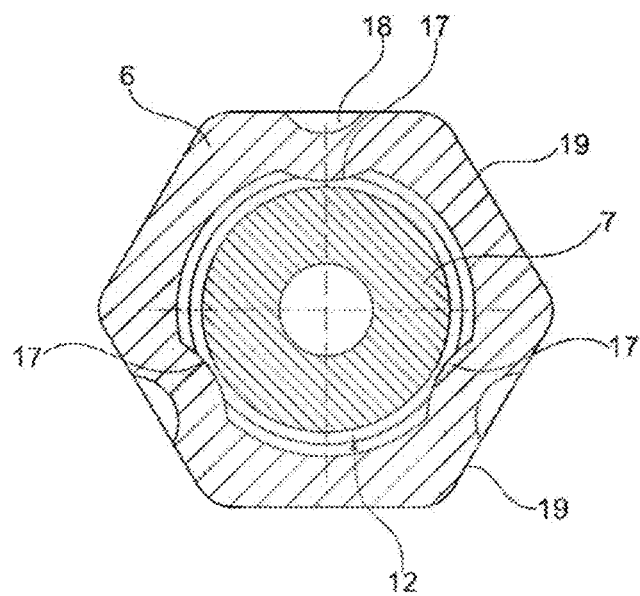
FIG. 2 is a sectional view of the screw connection device of FIG. 1 taken along the lines 2-2 of FIG. 1.

As can be derived from FIG. 1, and in particular FIG. 2, the detents 17 are formed by indentations 18. These indentations are obtained by stamping, thus by exerting a force radially inward on flat exterior sub-surfaces of the exterior surface 19 of nut 6. The detents 17 and indentations 18 are allocated to every second sub-surface 19 of the nut 6, in an alternating manner. In particular, the six sub-surfaces 19 enable a simple handling of the screw connection device.

Figure 3:
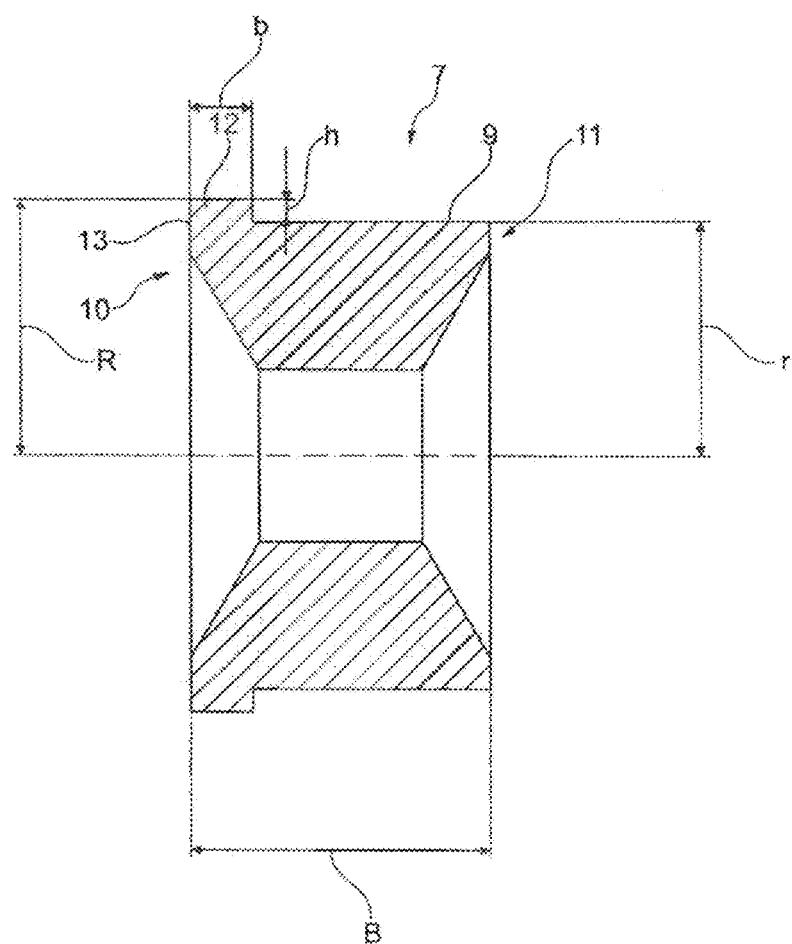
FIG. 3 is a sectional side or plan view of the spacers of the screw connection device of FIGS. 1 and 2.

The schematic dimensioning of the spacer 7 can be derived from FIG. 3. The first projection 12 has a first flank 13, which is flush with a wall of the end surface 10 of the spacer 7. A height h of the first projection 12 corresponds thereby to the difference between the greatest radial expansion R of the first projection 12 and the radius r of the spacer 7 in the region of the cylindrical exterior surface 9. In the present embodiment example, the height h is 0.35 mm, with a tolerance of 0.025 mm. The radius in the region of the cylindrical exterior surface 9 is 4.0 mm, with a tolerance of 0.025 mm. The width b of the first projection 12 is 1.0 mm, with a tolerance of 0.1 mm. The width B of the spacer 7 is 5.0 mm, with a tolerance of 0.2 mm.

Figure 4:
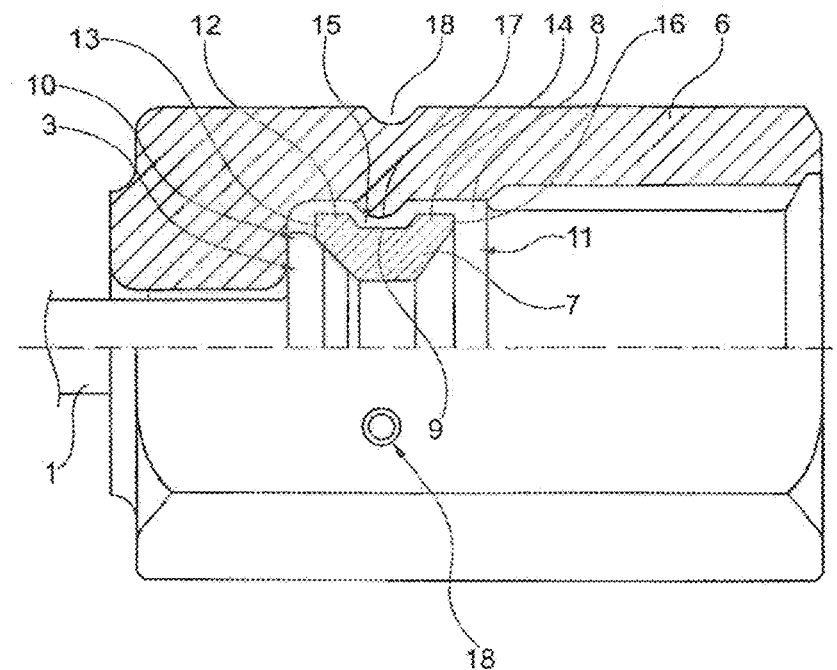
FIG. 4 is a plan view partially in section of an alternative embodiment of the screw connection device of the present invention.
Figures 5, 6:
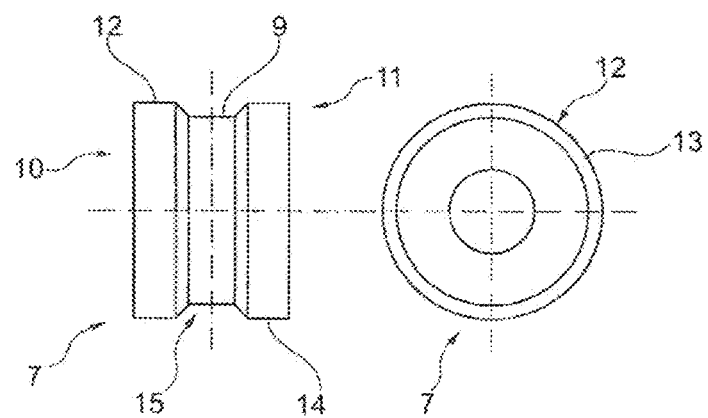
FIG. 5 is a side or plan view of the spacers of the screw connection device of FIG. 4.
FIG. 6 is an end view of the spacers of the screw connection device of FIG. 4

FIGS. 4 and 5 and 6 illustrate a second inventive screw connection device, which differs from the first inventive screw connection device substantially in that the spacer 7 has a second projection 14 with a second flank 16. The first projection 12 and the second projection 14 form a groove 15. The detents 17 extend radially inwardly sufficiently to interfere with projections 12 and 14 to prevent removal of spacers 7 from receiving space 8 of nut 6.

Various features of the present invention have been described with reference to the above illustrative embodiments. It should be understood that modifications may be made without departing from the scope of the invention as represented by the following claims.

The invention claimed is:

1. A screw connection device for connecting two pipes comprising two pipes with flanged pipe ends, a bolt, a nut, and a spacer, wherein the nut comprises a receiving space, wherein the spacer is securely received in the receiving space, wherein the spacer retains the first pipe securely in the nut, wherein the second pipe can be fastened in the nut by means of the bolt, wherein an exterior surface of the spacer has at least one cylindrical section, wherein the spacer has a first end surface and a second end surface, wherein the second end surface is faced towards the screw, wherein the first end surface is faced away from the screw, wherein a first projection is provided on the spacer, which engages with the nut in the region of the receiving space such that it is securely retained therein, wherein the nut defines at least one detent within the receiving space that securely retains the spacer therein, the at least one detent extending inward in the region of the receiving space and formed by an indentation on the exterior surface of the nut, and wherein the first projection borders on the first end surface of the spacer.

2. The screw connection device according to claim 1, wherein the first projection at least in part encompasses the spacer.

3. The screw connection device according to claim 1, wherein the first projection surrounds the spacer on the cylindrical exterior surface of the spacer.

4. The screw connection device according to claim 1, wherein the first projection is on the first end surface.

5. The screw connection device according to claim 1, wherein the first projection projects radially towards said nut within said receiving space of said screw.

6. The screw connection device according to claim 1, wherein a first flank of the first projection is flush with the first end surface of the spacer.

7. The screw connection device according to claim 1, wherein the first projection exhibits a height (h), corresponding to 1% to 20% of the radius (R) of the spacer in the region of the first projection.

8. The screw connection device according to claim 1, wherein the first projection has a width (b), corresponding to 5% to 50% of the overall width (B) of the spacer.

9. The screw connection device according to claim 1, wherein the spacer includes a second projection, which forms, together with the first projection, a groove, and wherein said detent resides in said groove.

10. The screw connection device according to one of the claim 9, wherein the second projection has a second flank, which is flush with the second end surface.

11. The screw connection device according to claim 1, wherein the nut includes, at least in sections, an exterior surface having at least six flat sub-surfaces, in the region of the receiving space, and said indentation is formed on one of said flat sub-surfaces.

12. The screw connection device according to claim 11, wherein at least one indentation is formed on at least three of the flat sub-surfaces in an alternating manner.

13. The screw connection device according to claim 12, wherein the three detents are distributed about the circumference of the nut at an angle of 90° to 150°.

* * * * *